Figure 1:
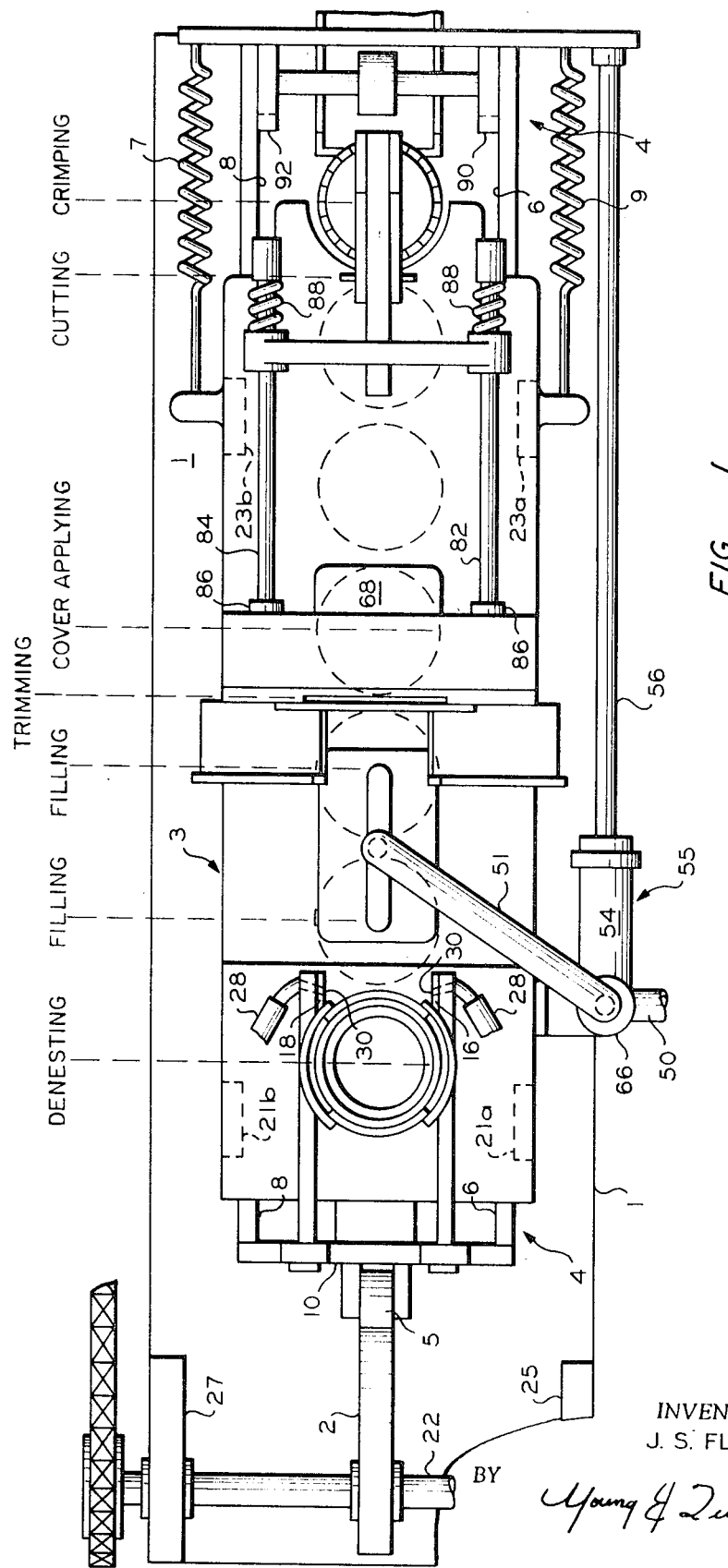

United States Patent

[11] 3,584,431

[72] Inventor John S. Flavelle
Peterborough, Ontario, Canada
[21] Appl. No. 844,482
[22] Filed July 24, 1969
[45] Patented June 15, 1971
[73] Assignee Phillips Petroleum Company

[54] METHOD AND APPARATUS OF FILLING AND SEALING CUPS
5 Claims, 5 Drawing Figs.
[52] U.S. Cl. .................................................. 53/37,
53/41, 53/281, 53/296
[51] Int. Cl. .................................................. B65b 3/04
[50] Field of Search.......................................... 53/37, 39,
41, 42, 267, 281, 282, 296, 329, 366; 156/69

[56] References Cited
UNITED STATES PATENTS
3,474,595 10/1969 Moroney et al................ 53/282X
3,509,683 5/1970 Sternav ......................... 53/282 X Primary Examiner—Theron E. Condon
Assistant Examiner—Robert L. Spruill
Attorney—Young and Quigg ABSTRACT: Method and apparatus are disclosed wherein a plurality of vertical, supported, nested, rimmed containers are denested individually and sequentially placed on a conveyor means wherein they are reciprocally advanced to a filling station where the container is filled. The containers are subsequently advanced to a cover applying station wherein a cover is heat sealed to the container after being removed from a source and trimmed to the approximate size of the container. Subsequently, the covered container is advanced to a cutting and crimping station wherein the remaining covering is cut off and the covering mechanically crimped around the container.

3,584,431

1

METHOD AND APPARATUS OF FILLING AND SEALING CUPS

This invention relates to a method and apparatus for automatically filling and sealing containers.

In the past, containers, particularly cups, containing individual servings of jellies, jams, condiments, mayonnaise, syrup, and cream, and other types of pourable materials, have been extensively used. Conventionally, the containers are denested, filled, and covered by a series of different operations which are not interrelated to one another. The result is that the lack of interrelation between the various functions of producing the finished product greatly increases the cost of packaging.

In one embodiment, this invention broadly comprises denesting, peripherally externally rimmed containers from a vertical supported stack and allowing the denested containers to fall onto a reciprocating conveying mechanism. After falling onto the reciprocating conveying mechanism, the reciprocating action sequences the cups through a filling operation, wherein they are filled, through a cover applying operation wherein a cover is heat sealed onto the container, and subsequently through a cutting and crimping operation wherein the covering material is finally cut so as to conform to the size of the container and a crimping head crimps the covering material over the container. The covering material is positioned to be heat sealed to the container as a result of the reciprocatory advancement of the containers pulling covering from a source and through a trimming station, wherein it is trimmed so as to conform to the approximate size of the container to be covered but the cover portion is not separated from the web.

Accordingly, it is an object of this invention to provide an apparatus and method for filling and sealing cups which is quick and efficient in operation and requires little attention.

Another object of this invention is to provide an apparatus and method for automatically filling cups with a liquid and thereafter both heat sealing and mechanically crimping the cover about the cups.

Another object of this invention is to provide an apparatus for automatically sealing and filling cups, the apparatus being inexpensive to manufacture and durable in structure.

Another object of this invention is to provide a single apparatus wherein the cups are denested, filled, and covered by a single piece of equipment operating in a reciprocal manner.

Another object of this invention is to reduce the initial cost that would be associated with individual pieces of equipment to perform the various denesting, filling, and covering functions.

Another object of this invention is to reduce labor and utilities cost through the operation of the simplified apparatus of this invention.

Other objects, advantages and features of this invention will be readily apparent to those skilled in the art from the following description, the drawings and appended claims.

Figure 2:
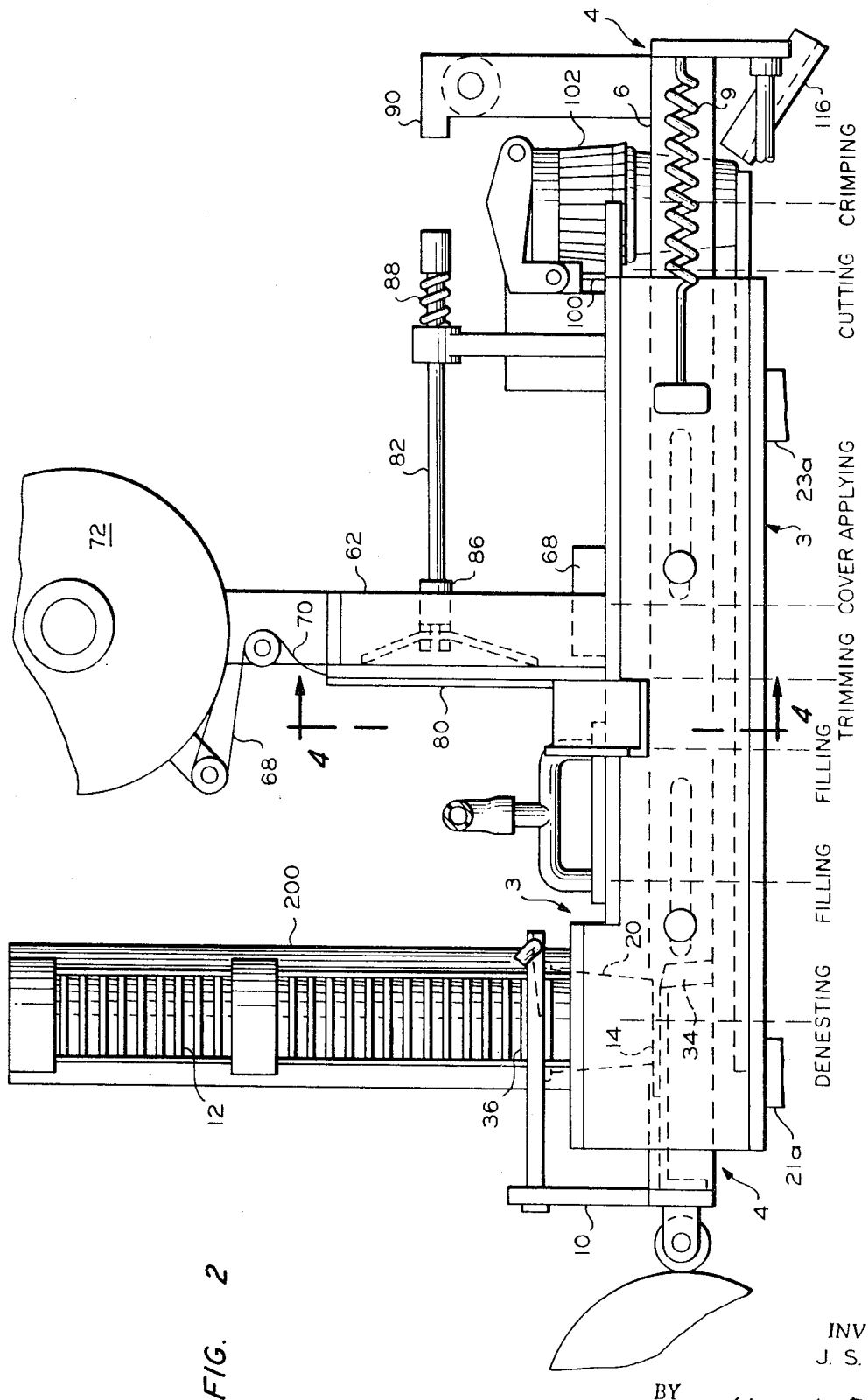
Figure 3:
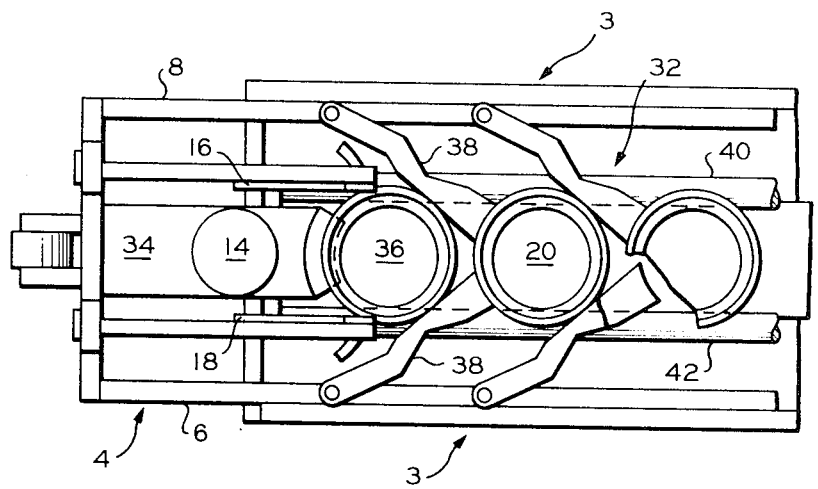
Figure 4:
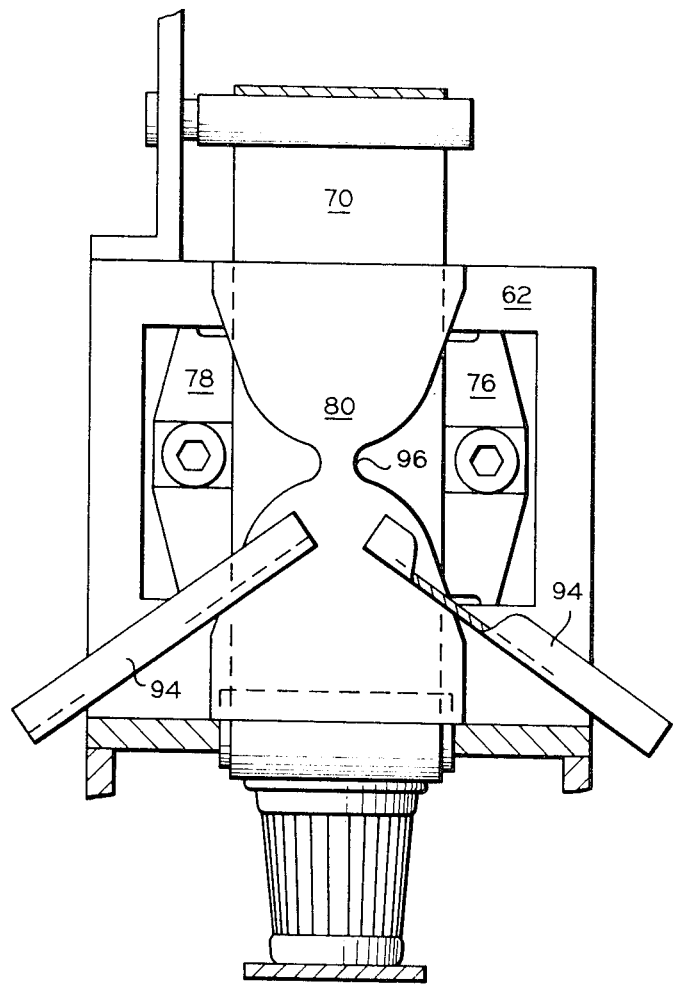
Figure 5:
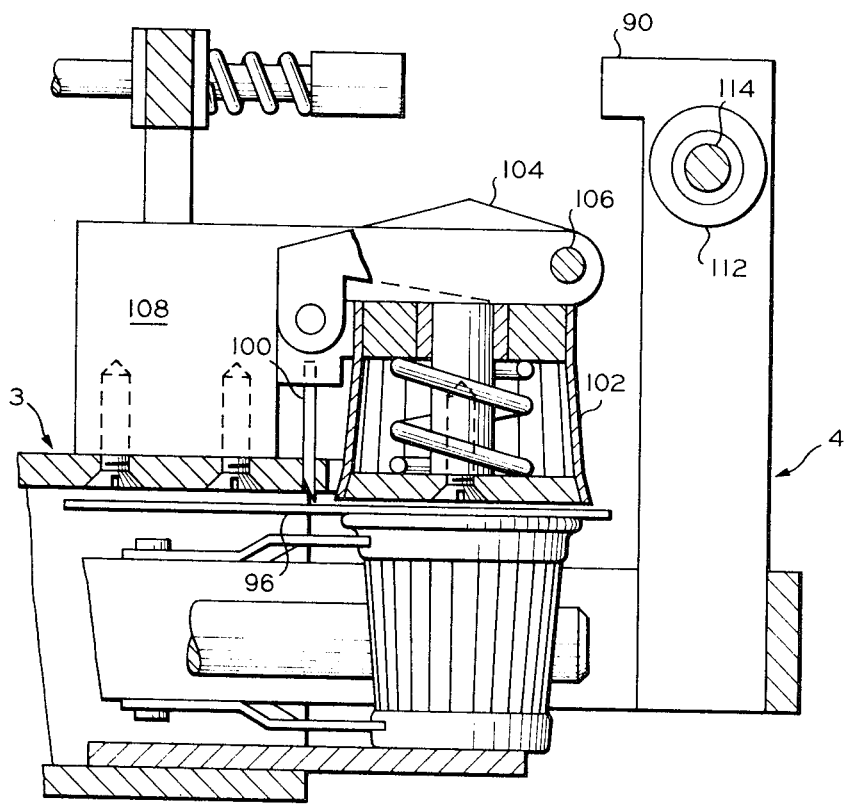

In FIG. 1, there is indicated a plan view of the apparatus of one embodiment of this invention indicating the various stations together with the reciprocatory action of the apparatus. In FIG. 2, there is indicated an elevation view corresponding with FIG. 1. In FIG. 3, there is indicated the conveying apparatus in plan view. In FIG. 4, there is indicated the trimming station as noted in FIG. 1. In FIG. 5, there is indicated the cutting and crimping station.

Referring now to FIGS. 1 and 2, in operation motor-driven cam 2 reciprocates a member generally designated as 4 relative to a stationary member generally designated as 3. Member 4 which carries rails 6 and 8 and pedestal 10 is biased so that follower 5 remains in contact with cam 2 by springs 7 and 9 attached at one end to reciprocating member 4 and at the other end to securing projections extending from member 3. Member 3 is stationarily supported by pedestals 21A and 21B and 23A and 23B fixed to base 1 which also supports plates 25 and 27 which in turn rotatably support cam 2 on driven shaft 22.

2

At the denesting station when the outermost throw of cam 2 occurs the stack of cups 12 in magazine 200 is supported on plate 14 attached to pusher shoe 34 extending from pedestal 10. As member 4 moves toward its innermost throw, wedges 16 and 18 move between the flange of the lowermost cup 20 and that next above it in stack 12 and lifts the stack slightly as plate 14 now supporting only the lowermost cup 12 moves from beneath the cups.

When plate 14 has moved from beneath cup 20, an air bellows (not shown) is actuated by the movement of member 4, and is compressed upon further rearward movement of member 4 thus blowing air through tubes 28 and openings 30 which blows cup 20 down into position in conveyor mechanism generally designated as 32 in FIG. 3 to be picked up by pusher shoe 34 during the next forward motion of member 4. Although gravity alone causes the cup to drop into place before shoe 34, it has been found that the air aids in more reliably positioning the cup before shoe 34. During the next forward movement of member 4, plate 14 is inserted into position below cup stack 12 and the cups are lowered into contact with plate 14 as wedges 16 and 18 move from beneath the flange of the new lowermost container 36 in stack 12. Cup 20 is pushed forward one station by shoe 34. During the next reciprocating cycle cup 36 is denested and placed in position in the conveyor mechanism 32 on the backstroke and cup 20 is engaged by spring biased pusher arms 38 which are pivotally attached to reciprocating member 4 and pivot outward on the backstroke of member 4, then close inwardly behind the cups so that on the forward stroke of member 4 the cups 20 and 36 are pushed ahead one station while rods 40 and 42 which are fixed to stationary member 3 frictionally engage the cups. This denesting and conveying sequence continues for each reciprocating cycle of member 4.

During the backstroke of member 4 the cups beneath the first and second filling stations receive a shot of cream from a pump 55 through tube 51 having a backflow check valve 66 attached to stationary member 3. The charge of cream is sucked from a container of cream (not shown) through tube 50 during the just previous forward stroke of member 4. The suction and discharge pressures are created by a piston moving within pump cylinder 54 under the action of piston rod 56 attached to reciprocating member 4. Each cup receives approximately half of its charge at one filling station and the remainder at the other filling station.

After the cups are filled they move to the cover applying station where an aluminum foil cover 70 having a hot melt adhesive coating on side 68 and a paper backing on the other side is heat sealed over the cup. The cover material is in strip form so the motion of the conveyor moving the cups with the lids sealed in place pulls cover material from a supply roll 72 through the trimming station past the cover applying station to the sealing station. According to this invention, the covering is first heat sealed and then mechanically sealed or crimped. The covering is heat sealed to the container by the action of heater element 68 which is suitably powered and controlled by a means to adjust the temperature of element 68 to heat sealing temperature.

Now referring to FIG. 4, where the trimming station is indicated as shown in FIG. 1, to FIG. 1 itself and also to FIG. 2, the covering material is trimmed at the trimming station to the approximate shape of the container opening by trim plates 76 and 78 and trim die plate 80. Trim plates 76 and 78 are fixed to rods 82 and 84 which are slidably supported by members 86 fixed to trim die plate 80 through frame 62. Trim plates 76 and 78 are biased away from trim die plate 80 by spring 88. Trim plates 76 and 78 are moved toward trim die plate 80 by rods 82 and 84 striking members 90 and 92 attached to reciprocating member 4 during the backstroke of member 4. The trimmed scrap from the trimming operation falls down chutes 94 and is discarded. A narrow web section 96 of cover material is left connecting successive covers so the cup advancement action will pull covering material from source 72. This narrow section is severed at the cutting station by blade 100 at the same time as the crimping station crimping head 102 forces the portion of the lid extending beyond the rim of the cups downwardly around the rim portion of the cup.

Now referring to FIG. 5 and also to FIGS. 1 and 2, blade 100 and crimping head 102 depend from cam bars 104 which are pivoted at 106 to block 108 which is attached to the stationary member generally designated as 3. Cam bars 104 are depressed by roller 112, which is rotatably supported by shaft 114, which is fixed to reciprocating member 4.

The filled, covered containers issue from the machine and slide down chute 116 to a collection system where they are boxed for shipment.

Thus, this invention is broadly applicable to filling and covering containers.

As noted, the drawing is diagrammatic and is not intended to fully show all component parts of the apparatus which one skilled in the art would routinely design for the operation thereof. Indeed, the showing of an element or piece of equipment does not mean that all such or similar pieces of equipment which may or can be designed by one skilled in the art in possession of this disclosure cannot be utilized as substitution therefor. Likewise, the omission of an element which one skilled in the art may include in the actual unit does not mean such a piece of equipment is intended to be omitted simply because it does not appear in the drawing.

I claim:

1. Reciprocating apparatus for denesting, filling, and covering containers comprising in combination:
   a. a framework;
   b. a means for producing reciprocating motion;
   c. conveyor means actuated by said reciprocating motion means to convey along a predetermined path a row of containers spaced apart from one another, so as to sequentially position, for a predetermined period of time during said reciprocating cycle, said containers at a filling station, a cover applying station, and a crimping and cutting station along said conveyor means;
   d. means located at a denesting station for denesting and positioning containers on said conveyor means;
   e. means to fill said containers located at said filling station and actuated by said reciprocating motion means;
   f. a source of a continuous web of heat sealable covering material;
   g. means located at said cover applying station to cover said containers by heat sealing a portion of said continuous web over said container so as to form a cover;
   h. means to crimp said cover around said container periphery located at said crimping and cutting station and actuated by said reciprocating motion means, said conveyor means advancing said covered container from the cover applying station to the crimping and cutting station and thus withdrawing said covering material from its source and positioning the covering material over the next container to be covered; and
   i. means located at said crimping and cutting station and actuated by said reciprocating motion to cut the cover of the crimped container free from said continuous web of covering material.

2. The apparatus of claim 1 wherein:
   a. said denesting and positioning means further comprises:
      1. magazine means for receiving and positioning a stack of nested, peripherally external rimmed containers in a substantially vertical position above said conveyor means,
      2. means actuated by said reciprocal motion means to support, during a first portion of said reciprocating cycle, said stack of nested containers by supporting the lower region of said lowermost container, said means withdrawing support of said stack during a second portion of said reciprocating cycle, and
      3. means actuated by said reciprocal motion means to support said stack of nested containers by engaging the rim of the next to lowermost container during said second portion of the reciprocating cycle and discharge onto said conveyor means during said second portion of the reciprocating cycle the lowermost container from the nested stack;
   b. said filling means further comprises:
      1. a source of fluid for filling said containers, and
      2. a pumping cylinder means actuated by said reciprocal motion means and a check valve, said pumping cylinder, and check valve being connected with suitable conduits and adapted to conduct said fluid from said source, through said pumping cylinder and check valve, and discharge said filling material into said container;
   c. said crimping means further comprises a crimping head pivotally mounted on cam bars attached to said frame so that during reciprocating motion said cam bars strike a cam follower attached to said conveyor means and cause said crimping head to crimp; and
   d. said cutting means comprises a cutting blade depending from said cam bars which mount said crimping head, said cutting blade thus cutting the crimped container cover free from said continuous web when said cam bars strike said cam follower.

3. The apparatus of claim 2:
   a. wherein said lowermost container from said nested stack is discharged onto said conveyor means by injecting compressed air between said lowermost container and said next to lowermost supported container; and
   b. further comprising a means actuated by said reciprocating motion means to cut the edges of said continuous web of covering material so as to form a series of connected covers of substantially the same shape as said rimmed periphery of the container.

4. A method of reciprocally denesting, filling, and covering containers comprising:
   a. initiating reciprocal motion;
   b. denesting, in a denesting zone, the lowermost container from a substantially vertical stack of nested, externally peripherally rimmed containers during a first portion of a first reciprocating cycle;
   c. conveying said denested container to a filling zone during a second portion of said first reciprocating cycle;
   d. filling said container with a fluid in said filling zone during a subsequent cycle;
   e. conveying said filled containers to a cover applying zone during a subsequent cycle;
   f. heat sealing in said cover applying zone a first portion of a continuous web of covering material over said container, so as to form a cover therein;
   g. conveying during a subsequent cycle said covered container to a cutting and crimping zone, a second portion of said continuous web of covering material being positioned over a subsequent container reciprocally advanced to said cover applying zone by the action of conveying to said cutting and crimping zone the container sealed to said continuous web by the covering operation;
   h. crimping said cover over said external peripheral rim in said cutting and crimping zone during said cycle wherein the covered containers are conveyed to said cutting and crimping zone; and
   i. cutting said cover free from said continuous web in said cutting and crimping zone during said cycle.

5. The method of claim 4 further comprising, prior to heat sealing the cover to said container in said cover applying zone, cutting the continuous web of covering material to form connected portions of covering material substantially the same size as the external peripheral rim of said container.